Jan. 16, 1962  V. J. KALLAL  3,016,878
AUTOMATIC HOG GATE
Filed July 31, 1958  2 Sheets-Sheet 1

Vincent J. Kallal
INVENTOR.

BY Clarence A. O'Brien
and Harvey B. Jacobson
Attorneys

Jan. 16, 1962 V. J. KALLAL 3,016,878
AUTOMATIC HOG GATE
Filed July 31, 1958 2 Sheets-Sheet 2
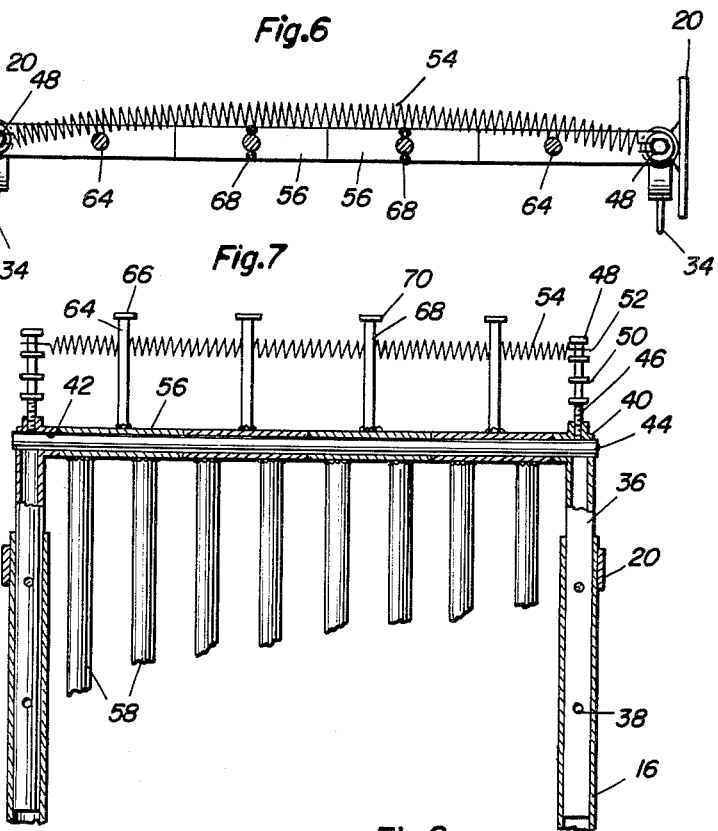
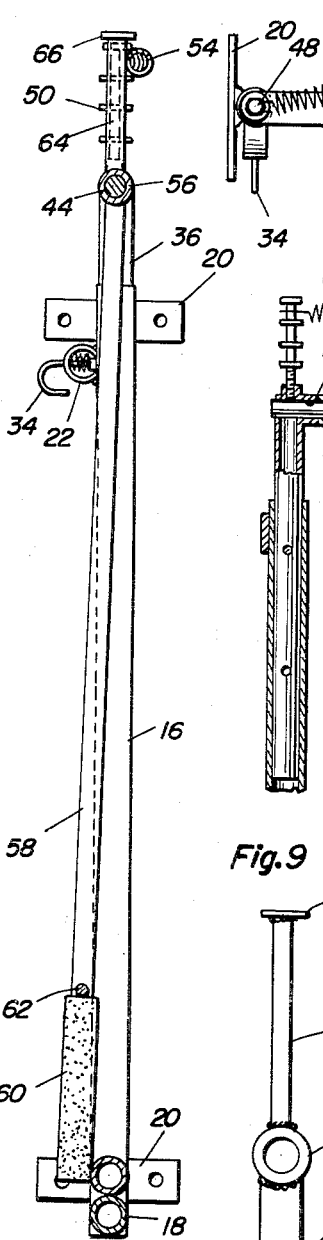
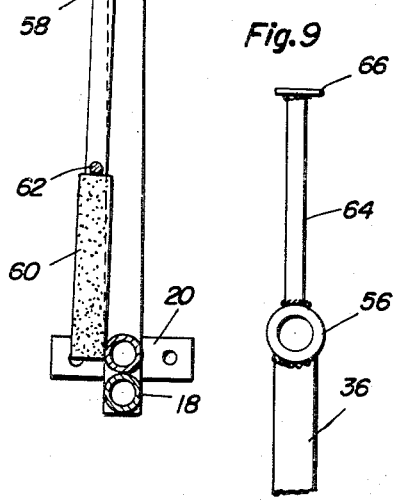
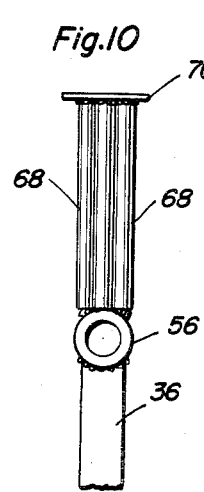
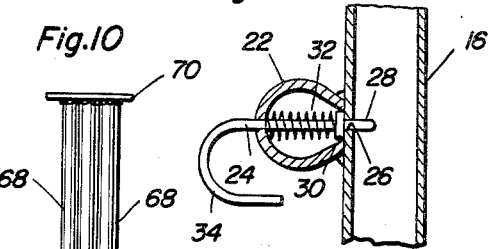
Vincent J. Kallal
INVENTOR.
BY *Clarence A. O'Brien*
*and Harvey B. Jacobson*
Attorneys United States Patent Office 3,016,878
Patented Jan. 16, 1962

3,016,878
AUTOMATIC HOG GATE
Vincent J. Kallal, R.F.D. 2, Jerseyville, Ill.
Filed July 31, 1958, Ser. No. 752,312
7 Claims. (Cl. 119—155)

The present invention generally relates to a gate construction and more particularly to a hog gate which will be automatically restored to a normal condition by gravity and which may be adusted so that hogs may pass through the gate in either direction or only in a single direction or not at all.

In the production and raising of hogs, it is desirable that at certain times to allow the hogs certain freedom of movement but prevent the movement of hogs in certain directions. For instance, hogs may be turned out of their feeding lot into the pasture and it is then desirable to allow the hogs to reenter the feed lot whenever they desire but prevent their return from the feed lot to the pasture. Therefore, it is the primary object of the present invention to provide an automatic hog gate which will permit movement in one direction or in both directions through the gate or prevent movement in either direction through the gate depending upon the adjustment of the gate consonant with the desires of the individual farmer.

Another object of the present invention is to provide a hog gate which is extremely simple in construction, easy to install, adjustable for different utilities, and relatively inexpensive to manufacture.

A further object of the present invention is to provide an automatic hog gate having a plurality of independent swingable bars so that the entire gate is not open to permit hogs to go through it in either direction or in both directions at the same time.

Another important feature of the present invention is to provide a gate constructed of tubular metal members having rubber cylindrical members over the metal at the bottom of the gate to prevent injury to the hogs.

Another important object of the present invention is to provide a hog gate in accordance with the preceding object in which the gate spring may be controlled for easier passage of smaller hogs.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 5 is a longitudinal, vertical sectional view taken substantially upon a plane passing along section line 5—5 of FIGURE 2 illustrating the structural details of the device;

FIGURE 6 is a plan sectional view taken substantially upon a plane passing along section line 6—6 of FIGURE 1 illustrating the tension spring construction for urging the swingable bars to a vertical position;

FIGURE 7 is a fragmental sectional view of the upper end portion of the gate illustrating the telescopic construction of the side members and the mounting means for the swinging bars;

FIGURE 8 is a detailed sectional view of the adjustment mechanism for the telescopic side members;

FIGURE 9 is a side elevational view of the upper end of one of the outer swing bars; and FIGURE 10 is a side elevation of one of the inner swing bars illustrating the construction thereof.

Figure 1:
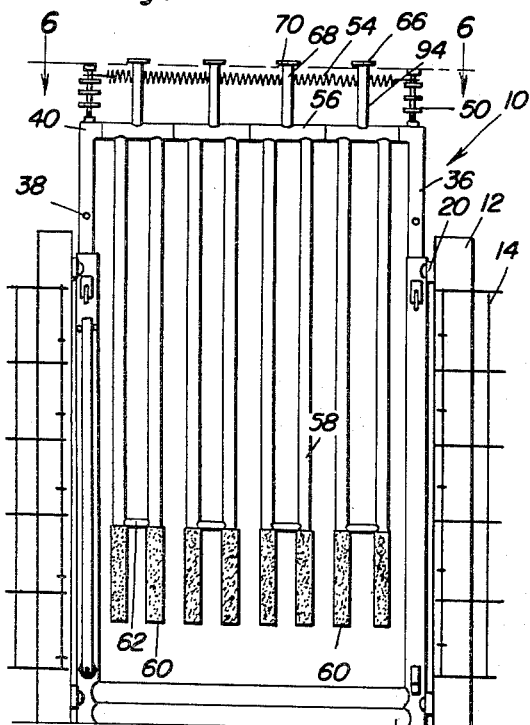
FIGURE 1 is an elevation of the hog gate illustrating the same in a position so that hogs may pass freely in either or both directions therethrough.

Referring now specifically to the drawings, the numeral 10 generally designates the automatic hog gate of the present invention which is mounted between a pair of vertical supports 12 which may be in the form of fence posts having hog wire 14 attached thereto or may be in the form of building wall structures or the side edges of an entrance to a building or to a cement feeding area. The device is readily adaptable for use in any type of passageway or areaway for purposes of forming a gate therein.

The automatic hog gate 10 includes a pair of upstanding tubular side members 16 which are rigidly interconnected by a pair of transverse bottom members 18. The side members 16 are each provided with a pair of vertically spaced supporting brackets 20 which extend in a horizontal direction for attachment to the supporting posts 12 by using any conventional fastening means.

Disposed adjacent the upper end of each of the tubular side members 16 is a loop member 22 more clearly seen in FIGURE 8 having a horizontally extending pin 24 extending therethrough with the pin 24 extending into the interior of the side member 16 through an aperture 26 with the inner end of the pin 24 being designated by the numeral 28. The pin 24 is provided with a stop member 30 thereon and a compression coil spring 32 is disposed between the stop member 30 and the inner surface of the loop 22 thus urging the pin 24 inwardly with the inner end 28 disposed within the tubular member 16. The pin 24 is provided with a U-shaped outer end 34 forming a handle for retraction of the inner end 28 of the pin 24.

Received in each of the tubular members 16 as seen in FIGURE 7 is an extensible tubular pipe 36 having spaced transverse apertures 38 for receiving the inner end 28 of the pin 24 for varying the effective height of the upper end of the tubular members 36. The upper end of each tubular member 36 is provided with an adapter 40 having a transverse opening 42 therein receiving an elongated support rod 44 which extends through the bores or passageways 42 and rigidly interconnects the tubular members 36. An elongated screw threaded bolt 46 extends vertically into the adapter 40 and acts as a setscrew for locking the shaft 44 in position. The bolt 46 is provided with a head 48 and a series of spaced peripheral or annular flanges 50 thereon with the flanges 50 on the bolts 46 being in horizontal alignment for receiving and positioning the hooked ends 52 of an elongated tension coil spring 54 extending between the bolts 46 and disposed either between the head 48 and an adjacent flange 50 or between adjacent flanges 50 for a purpose described hereinafter.

Pivotally and swingably mounted on the shaft 44 is a series of abutting rotatable sleeves 56 with each sleeve 56 having a pair of depending tubular bars 58 rigid therewith and preferably welded thereto with the lower ends of each of the bars 58 being provided with a cylindrical rubber member 60 and with the lower ends also being interconnected by a connecting rod 62 extending between the bars 58 thus forming the bars in rigid pairs with each rigid pair being swingable about the axis of the transverse shaft 44.

Secured to and extending in parallel relation to the bars 58 from the upper edge of the sleeve 56 in an upstanding arm 64 having a flange 66 on the upper end thereof for engagement with the spring 54 whereby the spring 54 will urge the bars 58 to a vertical position. The intermediate sleeves 56 are each provided with a pair of laterally spaced upstanding members 68 interconnected at their upper ends by a flange 70 with the upstanding members 68 engaging the coil spring 54 but engaging the same inwardly of the upstanding member 64 thus providing an arrangement where equal spring pressure will be exerted on each pair of the depending bars.

Figure 4:
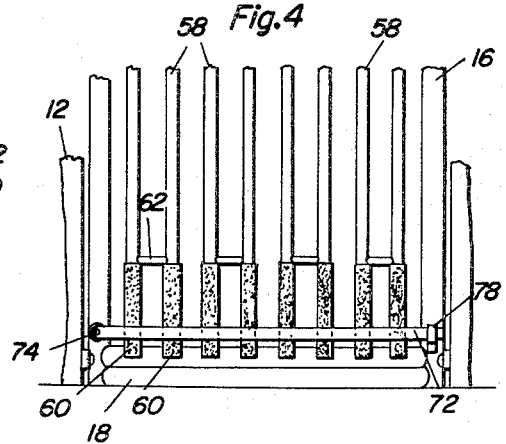
FIGURE 4 is a partial elevation of the bottom end of the hog gate illustrating the construction whereby hogs are prevented from passage in both directions.

Pivotally mounted on one of the side tubular members 16 adjacent the bottom end thereof is a lock bar 72 supported on a hinge pin 74 and held alongside of the tubular side member 16 by a pair of projecting pegs or detents 76. When the locking bar is swung downwardly to a horizontal position as illustrated in FIGURE 4, the free end thereof engages an offset latch 78 mounted on the lower end of the other side rail member 16 adjacent to but above the transverse members 18 with the offset latch 78 permitting the lock bar 70 to engage the outer surfaces of the cylindrical rubber members 60 with the hinge pin 74 also permitting the lock bar 72 to swing in a plane so that the lock bar will engage the surfaces of the cylindrical rubber members 60 in opposition to the transverse member 18 for preventing swinging movement of bars 58 in any direction.

Figure 2:
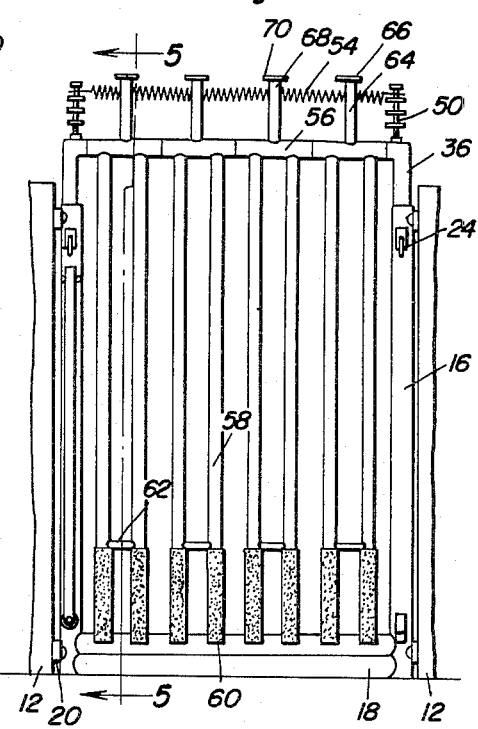
FIGURE 2 is an elevational view similar to FIGURE 1 but with the gate lowered to prevent passage of the hogs in one direction.
Figure 3:
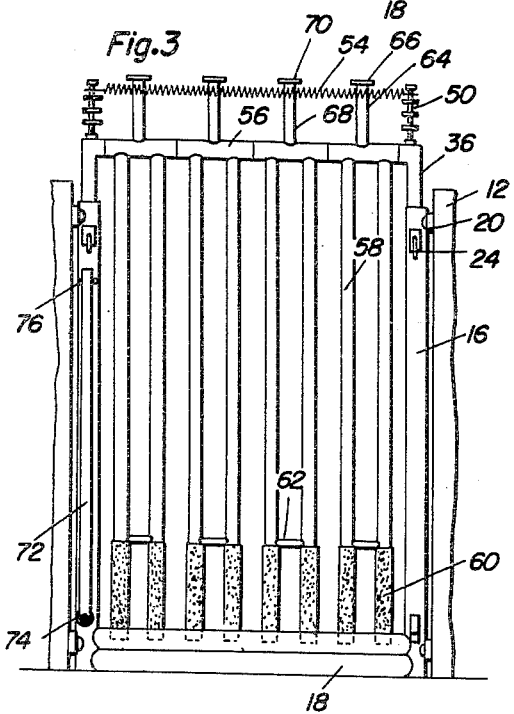
FIGURE 3 is an elevational view similar to FIGURE 2 but with the gate positioned to prevent passage of hogs in the other direction.

In actual use of the invention, the gate construction may be orientated as shown in FIGURE 1, that is, with the longitudinal members 36 extended or in elevated relation so that the lower ends of the rubber cylindrical members 60 are spaced above the transverse members 18 for free swinging movement of the pairs of depending bars 58 in either direction about the shaft 44 whereby hogs may pass through the gate in either direction with the rubber cylindrical member 60 preventing injury to the hogs. The spring 54 serves to urge the bars 58 to a vertical position and may be orientated on either side of the upstanding members 64 and 68. When it is desired to prevent the hogs from passing through the gate in one direction, the tubular members 38 are lowered by retracting the pins 24 in an obvious manner. All of the cylindrical rubber members 60 are disposed to the near side of the transverse members 18 or to the far side of the transverse members 18 as shown in FIGURES 2 and 3 respectively which orientation will prevent the hogs from travelling past the gate in one direction or the other. If it is desired to prevent passage of the hogs in either direction, the lock 72 is lowered as shown in FIGURE 4 when the cylindrical members 60 are in the position shown in FIGURE 2 thus locking the cylindrical members and the bars 58 from pivotal movement since the transverse members 18 will engage the members 60 on one side and the lock bar 72 will engage the members on the other side. The vertical adjustment of the spring in relation to the bolts will vary the spring tension urging the bars 58 to a normal position so that smaller hogs may pass through the gate easier. Also, the spacing of the vertical members 68 to either side of a central member such as the central member 64 in the intermediate assemblies will assure that substantially the same spring tension is exerted on each pair of bars 58.

The gate is constructed wholly of tubular metal with the rubber cylindrical members 60 clamped over the metal at the bottom of the gate to prevent injury to the hogs. There are provided four swing bars which operate independently of each other so that the entire gate is not open to permit hogs to go through it in both directions at the same time. The gate can be placed in a fence opening or in an entrance to a building or to a feeding area such as a cement feeding area. The device is a labor saving device in that hogs can be turned out of their feeding lot into pasture. By placing the gate of the present invention in such a position that they can reenter the feed lot from the pasture but cannot then return to the pasture, the farmer is not required to bring the hogs into the feed lot and lock them in. The hogs will return to the feed lot on their own volition and when they enter the feed lot they are locked in. Thus, the automatic gate generally controls the passage of hogs from one area to another for purposes of feeding, shipping, vaccination and other related purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hog gate comprising means defining a passageway, a transverse supporting shaft mounted by the defining means, a plurality of depending bars swingably mounted independently on said shaft and forming a closure for said passageway, a transverse abutment disposed in the bottom of the passageway, selectively operable means connected to the shaft for vertically positioning the bars within the passageway to permit two-way swinging thereof and to dispose lower ends of the depending bars on either side of the abutment by engagement therewith to prevent swinging movement of the bars in one direction in relation to the abutment and allowing swinging movement of the bars in the other direction thereby allowing passageway of hogs in the passageway in one direction only, and means pivotally mounted at one side of the gate and swingable across all of said bars for coaction with said abutment to prevent swinging of said bars in either direction when the lower ends of said bars are disposed on one side of the abutment.

2. The hog gate as defined in claim 1 wherein spring means is connected between the shaft and the bars for urging the bars to a normal condition for closing the passageway and including a spring extending transversely of all of said bars.

3. The hog gate of claim 1 wherein a pair of spaced bars is supported from a tubular sleeve rotatably mounted on said shaft, said pair of bars being rigidly interconnected, and a cylindrical rubber member enclosing the lower end of each bar for preventing injury to the hogs and acting as bumpers engaging said abutment.

4. The combination of claim 1 wherein a sleeve supports each bar and is rotatable on the shaft and provided with an upstanding member, a pair of stationary members are provided at each side of the gate in alignment with said upstanding members, and said spring is helical and extends between the stationary members for engagement with the upstanding members for urging the upstanding members and the depending bars to a normal position.

5. The combination of claim 1 wherein said last-named means comprises a lock bar for engaging the lower ends of the bars in opposition to said abutment.

6. A hog gate comprising, means defining a passageway, vertically adjustable gate mounting means mounted on the defining means above the passageway, a plurality of independently and hingedly mounted bar means depending from said gate mounting means within the passageway in both upper and lower positions of the mounting means, lock means mounted on the defining means at the bottom of the passageway for engagement with bar means for limiting swinging of the bar means to one direction and neither direction, selectively operable means mounted on the defining means and engageable with the gate mounting means for holding the mounting means in the upper or lower positions to condition the bar means for two-way swinging or limited swinging respectively and bar centering means operatively interconnecting the bar means and mounting means preventing simultaneous swinging of the bar means in opposte directions.

7. The combination as defined in claim 6, wherein said centering means includes resilient biasing means independently engageable with each bar means and adjustable anchoring means mounted on the mounting means for anchoring the resilient biasing means thereto at selected positions thereon to vary the centering bias of the resilient biasing means on the bar means.

References Cited in the file of this patent

UNITED STATES PATENTS

| | | |
|---|---|---|
| 910,717 | Olson | Jan. 26, 1909 |
| 1,116,867 | Anderson | Nov. 10, 1914 |
| 1,219,825 | Kluender | Mar. 20, 1917 |
| 1,566,552 | Manson et al. | Dec. 22, 1925 |
| 2,693,050 | Neid | Nov. 2, 1954 |